(12) United States Patent
Murray et al.

(10) Patent No.: US 8,635,452 B2
(45) Date of Patent: Jan. 21, 2014

(54) METHOD FOR GENERATING A CIPHER-BASED MESSAGE AUTHENTICATION CODE

(75) Inventors: Bruce Murray, Hamburg (DE); Mathias Wagner, Alvesen-Rosengarten (DE)

(73) Assignee: NXP B.V., Eindhoven (NL)

( * ) Notice: Subject to any disclaimer, the term of this patent is extended or adjusted under 35 U.S.C. 154(b) by 203 days.

(21) Appl. No.: 13/059,262

(22) PCT Filed: Aug. 12, 2009

(86) PCT No.: PCT/IB2009/053556
§ 371 (c)(1),
(2), (4) Date: Feb. 16, 2011

(87) PCT Pub. No.: WO2010/020910
PCT Pub. Date: Feb. 25, 2010

(65) Prior Publication Data
US 2011/0138182 A1   Jun. 9, 2011

(30) Foreign Application Priority Data

Aug. 19, 2008 (EP) .................................... 08105068

(51) Int. Cl.
*H04L 9/32* (2006.01)
(52) U.S. Cl.
USPC ........................................................ 713/168
(58) Field of Classification Search
USPC ........................................................ 713/168
See application file for complete search history.

(56) References Cited

U.S. PATENT DOCUMENTS

| | | | |
|---|---|---|---|
| 6,278,783 B1 | 8/2001 | Kocher et al. | |
| 6,298,442 B1 | 10/2001 | Kocher et al. | |
| 6,304,658 B1 | 10/2001 | Kocher et al. | |
| 6,327,661 B1 | 12/2001 | Kocher et al. | |
| 6,381,699 B2 | 4/2002 | Kocher et al. | |
| 6,510,518 B1 | 1/2003 | Jaffe et al. | |
| 6,539,092 B1 | 3/2003 | Kocher | |
| 6,654,884 B2 | 11/2003 | Jaffe et al. | |
| 7,403,620 B2* | 7/2008 | Liardet et al. | 380/259 |
| 7,668,310 B2 | 2/2010 | Kocher et al. | |
| 7,991,158 B2* | 8/2011 | Narendra et al. | 380/260 |
| 8,102,997 B2* | 1/2012 | Teglia et al. | 380/29 |
| 2003/0140240 A1 | 7/2003 | Jaffe et al. | |
| 2005/0175175 A1 | 8/2005 | Leech | |

(Continued)

FOREIGN PATENT DOCUMENTS

CN           101202623 A          6/2008

OTHER PUBLICATIONS

Menezes, A. J. et al. "Handbook of Applied Cryptography (Discrete Mathematics and Its Applications), Chapter 9—Hash Functions and Data Integrity", CRC Press, 61 pgs (Oct. 1996).

(Continued)

*Primary Examiner* — Kambiz Zand
*Assistant Examiner* — Stephen Sanders

(57) ABSTRACT

In a method for generating a cipher-based message authentication code, a state array (25) comprised of rows (31-34) of bytes (S'0-S'15) and columns (41-44) of bytes (S'0-S'15) based on a message to be transmitted is generated. The cipher-based message authentication code is generated by retaining the bytes (29, 30) of at least one row (32, 34) of the state array (25).

13 Claims, 6 Drawing Sheets

(56) References Cited

U.S. PATENT DOCUMENTS

2007/0286416 A1 12/2007 Bertoni et al.
2008/0104400 A1 5/2008 Kocher et al.
2012/0017089 A1 1/2012 Kocher

OTHER PUBLICATIONS

Song, JH et al. "The AES-CMAC Algorithm—RFC Editor" University of Washington, The Internet Society, 14 pgs, retrieved from the internet: www.rfc-editor.org/rfc/rfc4493.txt (Jun. 2006).

Menezes, A. J. et al. "Handbook of Applied Cryptography (Discrete Mathematics and Its Applications)—Chapter 7—Block Ciphers", CRC Press, pp. 62 pgs (Oct. 1996).

"Advanced Encryption Standard (AES)", Federal Information Processing Standards Publication 197, National Institute of Standards and Technology, 50 pgs, retrieved from the internet at: csrc.nist.gov/publications/fips/fips197/fps-197.pdf (Nov. 2001).

International Search Report for Patent Application No. PCT/IB2009/053556 (May 12, 2010).

Okeya, K. et al. "Side Channel Attacks on Message Authentication Codes", Information Processing Society of Japan, vol. 47, No. 8, 11 pgs (Aug. 2006).

Nakashima, S. et al. "Power Analysis Attack on AES and Countermeasure", The Institute of Electronics, Information and Communication Engineers, 6 pgs (2003) with English Abstract.

Daemen, J. et al. "A new MAC Construction ALRED and a Specific Instance ALPHA-MAC", STMicroelectronics, 18 pgs, retrieved from the internet at: www.researchgate.net/...New_MAC_Construction_ALRED_and_a_Speci... (2005).

Daemen, J. et al. "The Block Cipher BKSQ", Lecture Notes in Computer Sciences, vol. 1820, pp. 236-245 (2000).

"Florent Bersani, Re: [Cfrg] MACs: to Truncate or not to Truncate?", 4 pgs, retrieved from the internet Sep. 13, 2013: http://www.ietf.org/mail—archive/web/cfrg/current/msg00414.html (2004).

"lstewart at acm.org, Re:[Cfrg] MACs: to Truncate or not to Truncate?", 2 pgs, retrieved from the internet Sep. 13, 2013: http://www.ietf.org/mail—archive/web/cfrg/current/msg00433.html (2004).

Samiah, A. et al. "An Efficient Software Implementation of AES-CCM for IEEE 802.11i Wireless St", IEEE Proceedings of 31$^{st}$ Annual International Computer Software and Applications Conference, vol. 2, pp. 694-694 (2007).

Dworkin, M. "Recommendation for Block Cipher Modes of Operation: The CMAC Mode for Authentication", NIST Special Publication 800-38B, National Institute of Standards and Technology, 26 pgs. retrieved from the internet at: csrc.nist.gov/publications/nistpubs/800-38B/SP_800-38B.pdf (May 2005).

* cited by examiner

US 8,635,452 B2

METHOD FOR GENERATING A CIPHER-BASED MESSAGE AUTHENTICATION CODE

FIELD OF THE INVENTION

The invention relates to a method for generating a cipher-based message authentication code.

BACKGROUND OF THE INVENTION

Message authentication codes (MACs) are pieces of information used to authenticate messages. Inputs for an algorithm to generate a MAC are a secret key and the message to be authenticated. Cipher-based MACs (CMAC) are block cipher-based message authentication codes and are described, for instance, in NIST (The National Institute of Standards and Technology) special publication 800-38B, May 2005.

The CMAC on a message is constructed by splitting it into blocks of size equal to the blocksize of the underlying cipher, for instance, 128 bits in the case of the Advanced Encryption Standard (AES), Cipher Block Chaining (CBC)-encrypting the message (with padding in the last block if required), and retaining (all or part of) the result of the last block encryption as the computed MAC value.

To avoid certain classes of attack, the last block is subjected, before ciphering, to an exclusive disjunction (XORing) with one of two possible "subkey" values, usually denoted as K1 or K2, derived from an encryption of the zero vector under the key in use. The choice of which subkey to use is determined by whether the last message block contains padding or not. The subkey values can only be computed by parties knowing the cipher key in use.

If the MAC is shorter than the cipher blocksize, then the standard dictates that the computed MAC should be truncated by retaining the required number of most significant bits.

If a MAC is computed on a message of size less than or equal to the cipher blocksize, then the last block is also the first block, so the modification by subkey XORing is performed on this single block. This means that the direct input to the block operation of the cipher during this MAC computation is not known to an external observer.

FIG. 1 shows a state array 1 and its byte numbering in accordance with the AES disclosed in Federal Information Processing Standard (FIPS) publication 197, Nov. 26, 2001.

The AES cipher operates on the state array 1 of bytes, which is of size 4 bytes by 4 bytes and has byte entries $S_{r,c}$, wherein the index "r" references the relevant row and the index "c" references the relevant column of the state array 1. When representing the outputs of an AES cipher operation as a bit-string, the bytes are ordered as follows:

$S_{0,0} S_{1,0} S_{2,0} S_{3,0} S_{0,1} S_{1,1} S_{2,1} S_{3,1} S_{0,2} S_{1,2} S_{2,2} S_{3,2} S_{0,3} S_{1,3} S_{2,3} S_{3,3}$

Subsequently, the bytes of this bit-string are numbered according to a convention in which $s_{15}$ is the leftmost or most significant byte and $s_0$ is the rightmost or least significant byte, so that $$s_{r,c} = s_{15-(4c+r)}$$

The standard method for truncation of a MAC in accordance with the aforementioned NIST standard is to retain the required number of most significant bits. Accordingly, truncation of an AES-based MAC to 8 bytes corresponds to retention of final state bytes $s_{15}$ to $s_8$ inclusive.

FIG. 2 shows as an example a 16-byte AES state during the final round of a MAC computation according to the standard. At the start of a so-called Cipher, an initial Round Key 21 is added to the state array 1 of FIG. 1 in order to generate a state array 22 (AddRoundKey operation). The state array 22 is subjected to a ShiftBytes transformation to generate a first transformed state array 23, which is subjected to a ShiftRow transformation to generate a second transformed state array 24. Then, a further Round Key 26 is added to the second transformed state array 24 by XORing each column of the State of the second transformed state array 24 with a word from a key schedule to generate an output state array 25 comprised of rows 31-34 and columns 41-44. The state array 25 is utilized for computing the CMAC in accordance with the standard by retaining the 8 most significant bytes $s_{15}$ to $s_8$ after truncation and the remaining bytes are discarded. The 8 most significant bytes 27 $s_{15}$ to $s_8$ are illustrated shaded.

The arrays 22-24 show the corresponding bytes before the effect of the ShiftRows and SubBytes operations of the final round. So, based on observations of the shaded output bytes and hypotheses about the corresponding positions in the final Round Key 26 array, a Differential Power Analysis (DPA) attacker is able to recover some bytes of the Round Keys 21, 26.

At this stage, the attacker can gather additional information about the 2nd-last round key, since he/she can compute the AES key expansion in reverse order.

The AES key expansion algorithm can be written in the form $$w_{n-4} = T(w_{n-1}) <+> w_n$$

wherein $w_n$ is a 32-bit word corresponding to a column of the Round Key 21, 26 array, "<+>" denotes the "exclusive-OR" operation, and T( ) is a conditional transformation such that $$T(w_n) = S(w_n <<< 8) <+> R\text{const}; \text{ if } n = 0 \bmod 4,$$
$$\text{or } T(w_n) = w_n \text{ otherwise}$$

<<<8 denotes left rotation by 8 bit positions, S( ) denotes bytewise application of SubBytes, and Rconst is a round constant which varies per round but is known.

With this combination of bytes, running the key expansion algorithm forwards again yields further final round key bytes. At this point, the attacker can proceed no further without considerable difficulty. The operation preceding the 2nd-last round key insertion is a MixColumns, and with only two bytes/column available at the input to SubBytes, the equations required to construct DPA selection functions based on earlier bytes are underdetermined. However, he/she has already reduced the attack complexity to only $2^{40}$ (since only 5 bytes of the last round key remain unknown) and at this level the remaining key bytes could easily be recovered by a brute force attack.

OBJECT AND SUMMARY OF THE INVENTION

It is an object of the present invention to provide a method for generating a cipher-based message authentication code which complicates a DPA attack.

The object is achieved in accordance with the invention by means of a method for generating a cipher-based message authentication code, comprising the steps of:

generating a state array comprised of rows of bytes and columns of bytes based on a message to be transmitted and computing a cipher-based message authentication code for the message by retaining the bytes of at least one row of the state array.

As discussed in the introduction, cipher-based message authentication codes (CMACs) are pieces of information used to authenticate messages. One input for generating the CMAC is the message to be authenticated. During generating the CMAC, a state array based on the message to be transmitted is generated.

Conventional CMAC generation is also based on this state array, but retains the 8 most significant bytes of this state array for the CMAC. According to the inventive method, however, the CMAC is computed utilizing bytes from at least one row of the state array. The bytes of the remaining rows are discarded. This may have the result that a differential power attack is harder to be carried out on the inventive method.

According to one embodiment of the inventive method, the bytes of two rows are utilized and the bytes of the remaining rows are discarded. Particularly, one row whose bytes are discarded is in between the two rows whose bytes are retained for the inventive CMAC computation. If the state array is comprised of four rows and four columns, then the two rows whose bytes are retained for the inventive CMAC computation may be the two even or the two odd rows of the state array.

Alternatively to computing the CMAC by retaining the bytes of at least one row of the state array, the cipher-based message authentication code for the message may be computed by subjecting at least two bytes of the message or two bytes of the message which have been pre-processed to an "exclusive-OR" operation. The bytes of the message may be pre-processed in order, for instance, to generate the state array comprised of rows of bytes and columns of bytes based on the message. Then, at least two bytes of the state array may be subjected to the "exclusive-OR" operation. The "exclusive-OR" operation is usually referred to as "XOR" operation.

The cipher-based message authentication code may be generated by subjecting bytes corresponding to one half of the message with bytes corresponding to the other half of the message to the "exclusive-OR" operation. If the message was pre-processed in order to generate the state array, then the cipher-based message authentication code may be computed by subjecting bytes corresponding to one half of the state array with bytes corresponding to the other half of the state array to the "exclusive-OR" operation. Then, all bytes of the message or all bytes of the state array are used alleviating the possibility of a successful DPA attack. To attack such an approach, the differential power analysis (DPA) (attack) would need to construct and test hypotheses about two key bytes from the final round key at a time. The attacker's correlation analysis would need to search for pairs of internal byte signals which supported hypotheses about each round key byte pair. So the initial DPA analysis becomes more difficult as compared to utilizing the conventional CMAC computation according to the standard.

The state array may particularly be generated according to the Advanced Encryption Standard (AES) as published, for instance, in the Federal Information Processing Standard (FIPS) publication 197, Nov. 26, 2001 and as briefly described in the introduction. Then, the state array which is used to compute the cipher-based message authentication code (CMAC) according to the inventive method comprises exactly four rows of bytes and exactly four columns of bytes.

The state array does not need to be computed according to the AES standard and thus does not necessarily comprise four rows and four columns. In general, any number of rows or columns can be used. A more general concept is referred to as Rijndael. Particularly, the state array may comprise exactly four rows of bytes and six columns of bytes, or four rows of bytes and eight columns of bytes.

The message for which the CMAC is computed may be a single block message. Then, the message can be represented by a single state array when based, for instance, on the AES standard. In other word, the size of the message is less than or equal to the cipher blocksize. This variant may have improved resistance against a differential power analysis attack.

BRIEF DESCRIPTION OF THE DRAWINGS

The invention will be described in greater detail hereinafter, by way of non-limiting examples, with reference to the embodiments shown in the drawings.

DETAILED DESCRIPTION OF THE EMBODIMENTS

Figure 1:
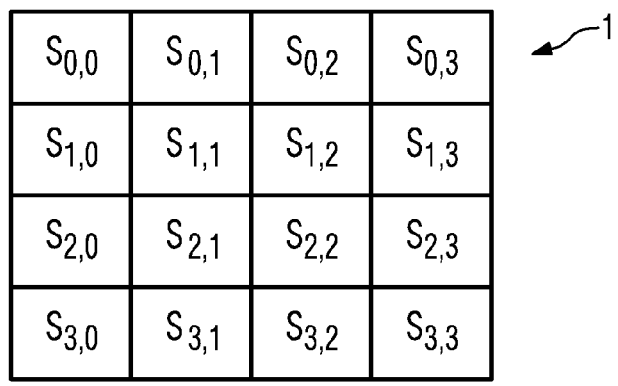
FIG. 1 is a state array representing a single block message.
Figure 2:
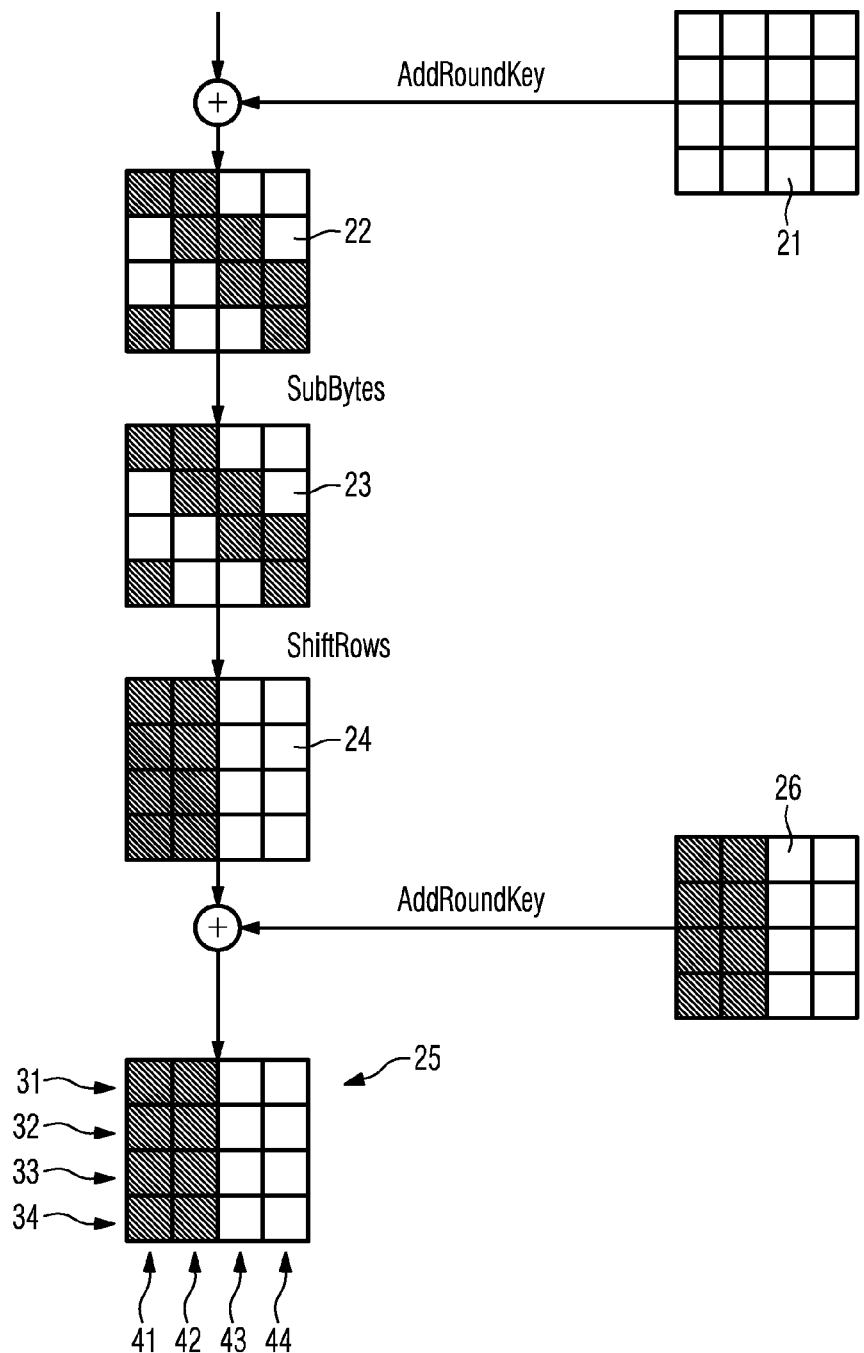
FIG. 2 illustrates the final round of a MAC computation according to the AES standard.

FIGS. 1 and 2 have been discussed in the introduction.

Figure 3:
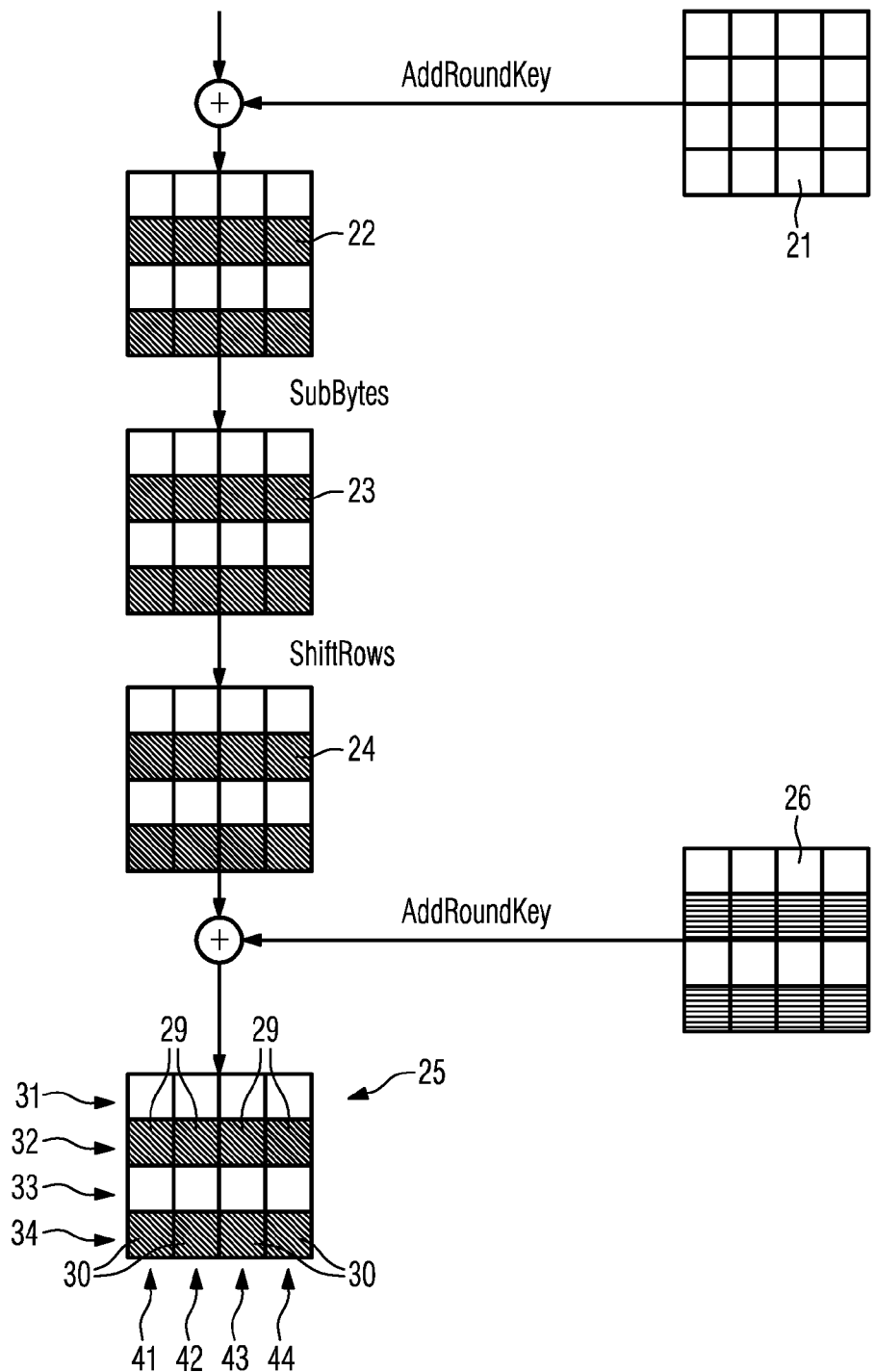
Figure 4:
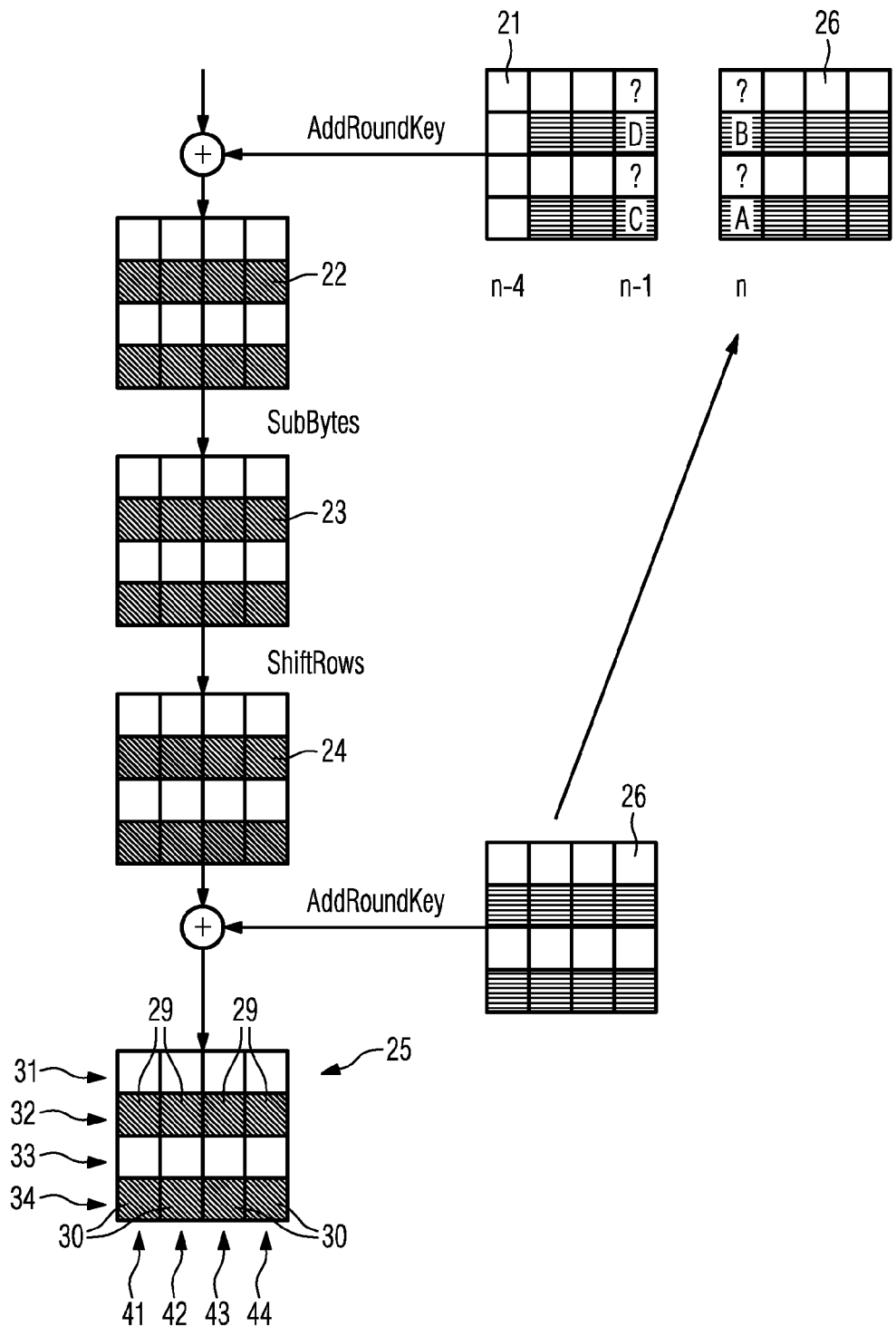
Figure 5:
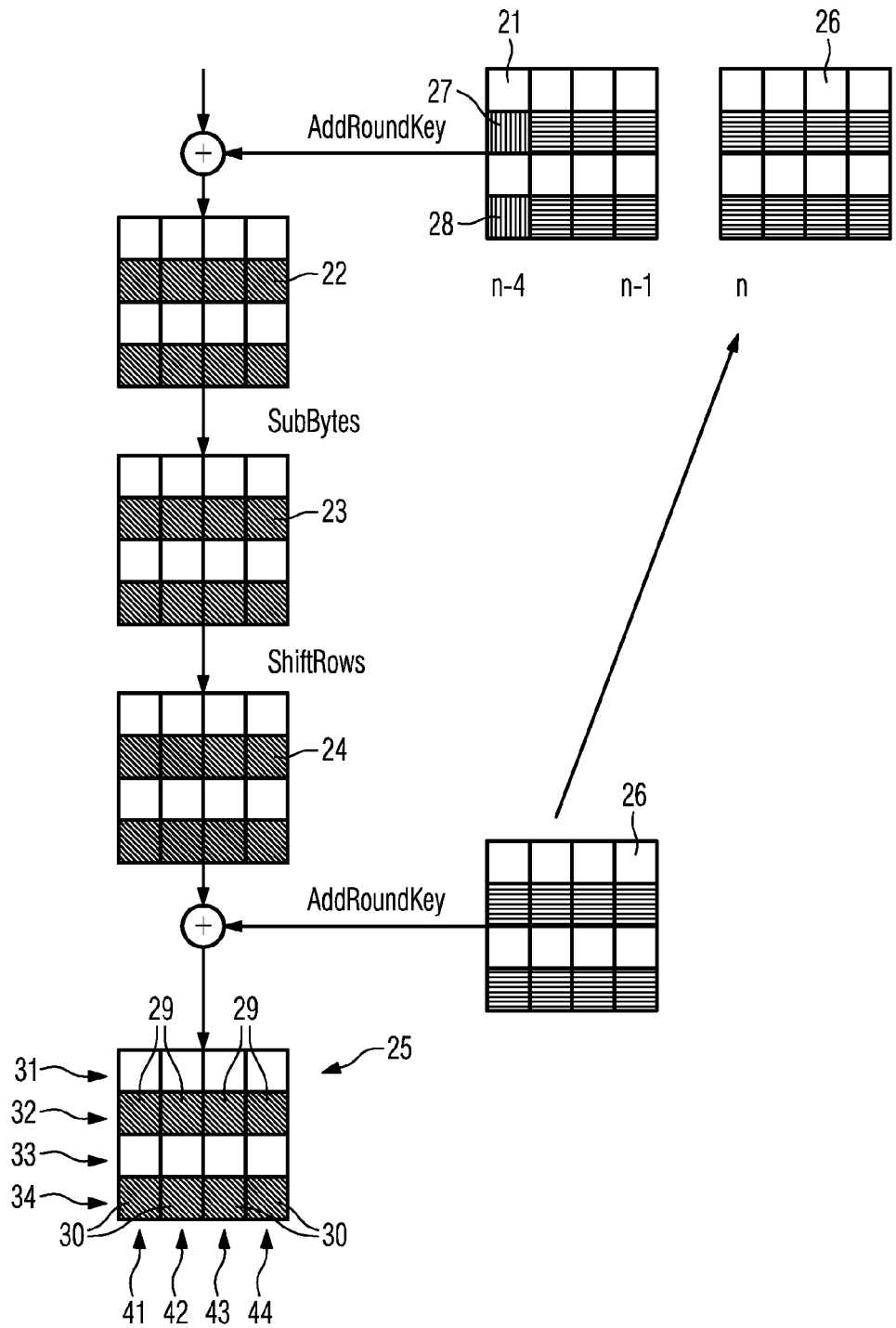

FIGS. 3-5 illustrate a potential differential power attack on a CMAC which has been computed in accordance with the inventive method.

For the exemplary embodiment, the state array 25 used for computing the CMAC is obtained as discussed in the introduction. The state array 25 is comprised of four rows 31-34 and four columns 41-44. Additionally, the message on which the state array 25 is based is a single block message as represented by the state array 1 shown in FIG. 1.

For the exemplary embodiment, the CMAC is computed by retaining the bytes 29, 30 of two of the four rows 31-34 of the state array 25. The bytes of the remaining rows are discarded. For the example shown, the bytes 29, 30 of row 32 and row 34, which are shaded in FIGS. 3-5, are retained and the bytes of the remaining rows 31, 33 are discarded. Therefore, the even-numbered bytes of the state array 25 are retained for computing the CMAC for the exemplary embodiment.

A potential differential power analysis yields the following:

By mechanisms analogous with the previous description in the introduction, the operations of ShiftRows and SubBytes can be seen to expose only bytes in the selected rows, whose corresponding bytes are shaded, to a DPA-attacker, whilst the final round key bytes he/she can recover are confined to these same two rows. With the same attack strategy, he/she can now run the key expansion backwards to obtain a number of bytes of the 2nd-last round key as shown in FIG. 4 (still confined to the selected rows).

Applying this as a purely computational process, with the separation example shown, will only allow the attacker to recover the 6 bytes shown shaded of the 2nd-last round key 21. This is due to the effect of the conditional transform which includes a byte rotation when n=0 mod 4.

Figure 6:
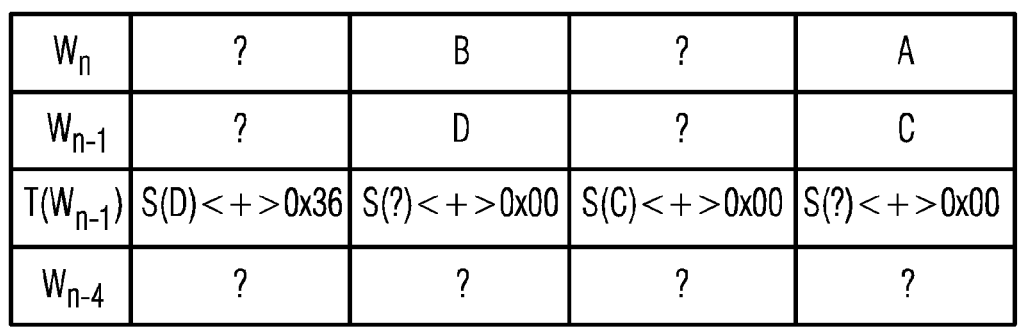
FIGS. 3-6 illustrate the final round of an inventive CMAC computation including a potential DPA attack.

To clarify this, the bytes of the iteration relationship which affect the leftmost column of the 2nd-last round key 21 are labeled A, B, C and D (for known bytes), with "?" denoting an unknown byte, as shown in FIG. 6. In computing column n-4, the conditional transform T( ) comes into play and we can see from FIG. 6 that none of the bytes are computationally available.

In the table of FIG. 6, which shows the iteration relationship $$w_{n-4} = T(w_{n-1}) <+> w_n$$

it should be appreciated that the known bytes within $T(w_{n-1})$ align with unknown bytes in $w_n$ and vice versa due to the rotation performed within the conditional transformation T( ), so no further 2nd-last round key 21 bytes are available by computation. The hexadecimal values shown in the row of the table of FIG. 6 giving $T(w_{n-1})$ are the bytes of the appropriate Rconst value.

As illustrated by FIG. 5, the attacker can still recover 2 further bytes 27, 28 of 2nd-last round key 21 by extending his/her DPA analysis, since he/she knows bytes in the corresponding state positions for every trace he/she has gathered.

Nonetheless, this further processing does not improve the attacker's position, since no more than 8 bytes of any round key 21, 26 have been recovered. The remaining complexity of attack is $2^{64}$ which is a significant improvement on the remaining resistance arising from use of the standardized MAC truncation approach. Although earlier round key bytes (e.g. 3rd-last) can be computed, this yields the attacker no further benefit.

Figure 7:
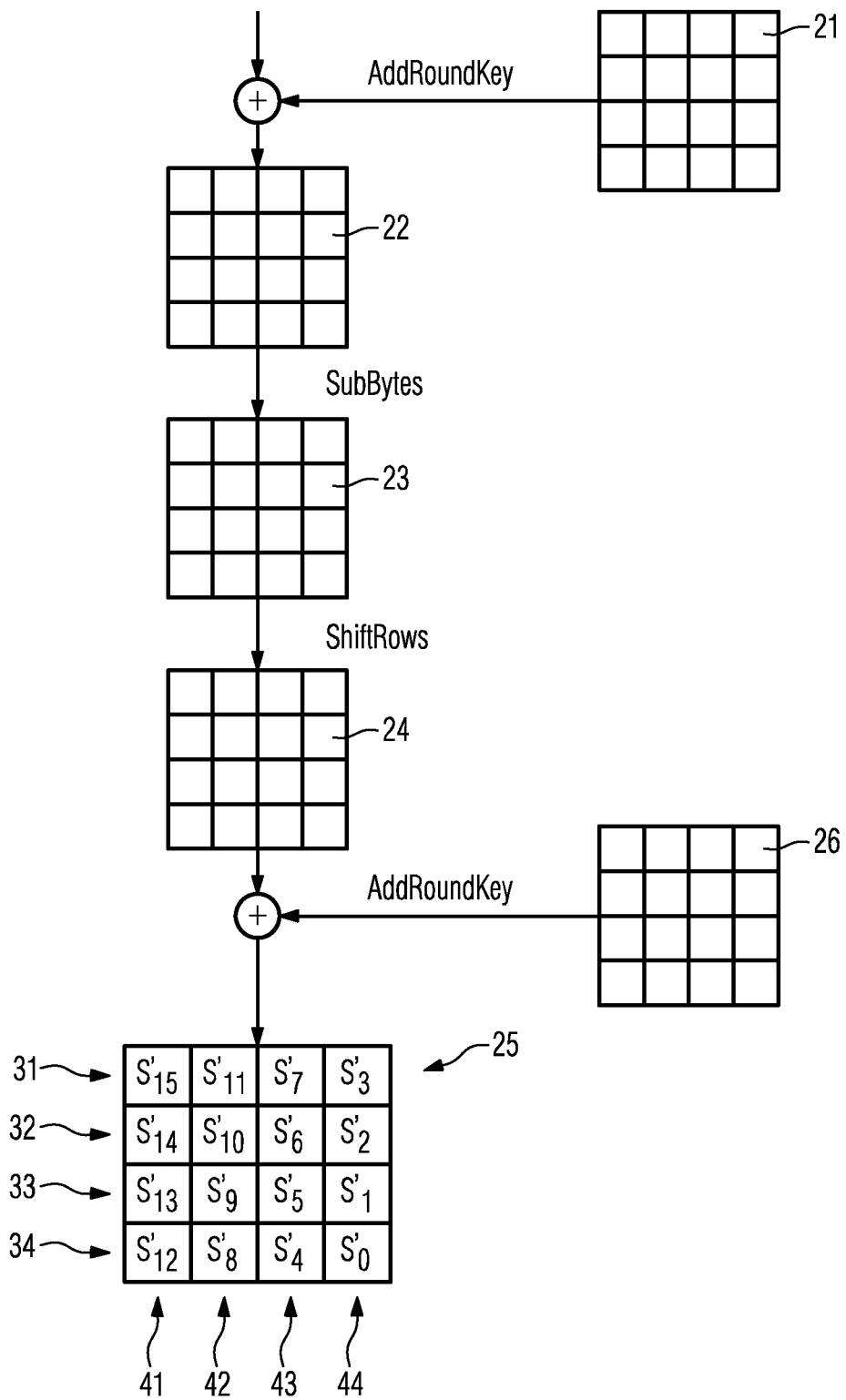
FIG. 7 illustrates the final round of another inventive CMAC computation.

FIG. 7 illustrates a further embodiment of a CMAC computation. For the exemplary embodiment, the state array 25 used for computing the CMAC is obtained as discussed above. The state array 25 is comprised of four rows 31-34 and four columns 41-44. Additionally, the message on which the state array 25 is based is a single block message as represented by the state array 1 shown in FIG. 1. The state array 25 comprises 16 bytes $s'_0$-$s'_{15}$.

For the exemplary embodiment, the CMAC is computed by subjecting at least two bytes $s'_0$-$s'_{15}$ of the state array 25 to an "exclusive-OR" operation. Particularly for the embodiment depicted in FIG. 7, the CMAC is computed by XORing the bytes $s'_0$, $s'_2$, $s'_4$, $s'_6$, $s'_8$, $s'_{10}$, $s'_{12}$, $s'_{14}$ of rows 34, 32 with the bytes $s'_1$, $s'_3$, $s'_5$, $s'_7$, $s'_9$, $s'_{11}$, $s'_{13}$, $s'_{15}$ of rows 33, 31.

Especially for the exemplary embodiment, the CMAC is computed as following:

$$\text{CMAC} = \{s'_0 <+> s'_1; s'_2 <+> s'_3; s'_4 <+> s'_5; s'_6 <+> s'_7; s'_8 <+> s'_9; s'_{10} <+> s'_{11}; s'_{12} <+> s'_{13}; s'_{14} <+> s'_{15}\}$$

wherein "<+>" denotes the "exclusive-OR" operation.

Finally, it should be noted that the aforementioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. The mere fact that certain measures are recited in mutually different dependent claims does not indicate that a combination of these measures cannot be used to advantage.

The invention claimed is:

1. A method with resistance to Differential Power Analysis attack for generating a cipher-based message authentication code for a message to be transmitted, comprising:

generating a state array comprised of rows of bytes and columns of bytes based on the message to be transmitted and computing a cipher-based message authentication code for the message by retaining the bytes of at least one row of the state array and discarding the bytes of the remaining rows of the state array where the remaining rows include at least one row.

2. The method of claim 1, wherein the state array comprises exactly four rows of bytes and exactly four columns of bytes, exactly four rows of bytes and exactly six rows of bytes, or exactly four rows of bytes and exactly eight rows of bytes.

3. The method of claim 1, comprising generating the state array according to the Advanced Encryption Standard.

4. The method of claim 1, comprising computing the cipher-based message authentication code by retaining the bytes of exactly two rows of the state array.

5. The method of claim 1, wherein the message is a single block message.

6. A secure smartcard system with resistance to Differential Power Analysis attack using a method for generating a cipher-based message authentication code for a message to be transmitted that comprises:

generating a state array comprised of rows of bytes and columns of bytes based on the message to be transmitted; and computing a cipher-based message authentication code for the message by retaining the bytes of at least one row of the state array and discarding the bytes of the remaining rows of the state array where the remaining rows include at least one row.

7. The system of claim 6, wherein the state array comprises exactly four rows of bytes and exactly four columns of bytes, exactly four rows of bytes and exactly six rows of bytes, or exactly four rows of bytes and exactly eight rows of bytes.

8. The system of claim 6, comprising generating the state array according to the Advanced Encryption Standard.

9. The system of claim 6, comprising computing the cipher-based message authentication code by retaining the bytes of exactly two rows of the state array.

10. The system of claim 6, wherein the message is a single block message.

11. A method with resistance to Differential Power Analysis attack for computing a cipher-based message authentication code for a message having a plurality of bytes to be transmitted, comprising:

pre-processing the bytes of the message;

generating a state array comprised of rows and columns of bytes based on the message; and XORing bytes corresponding to one half of the state array with bytes corresponding to the other half of the state array.

12. The method of claim 11, wherein the message is a single block message.

13. The method of claim 11, comprising generating the state array according to the Advanced Encryption Standard.

* * * * *